F. KOCH.
OVEN.
APPLICATION FILED MAR. 27, 1915.

1,150,865.

Patented Aug. 24, 1915.
5 SHEETS—SHEET 1.

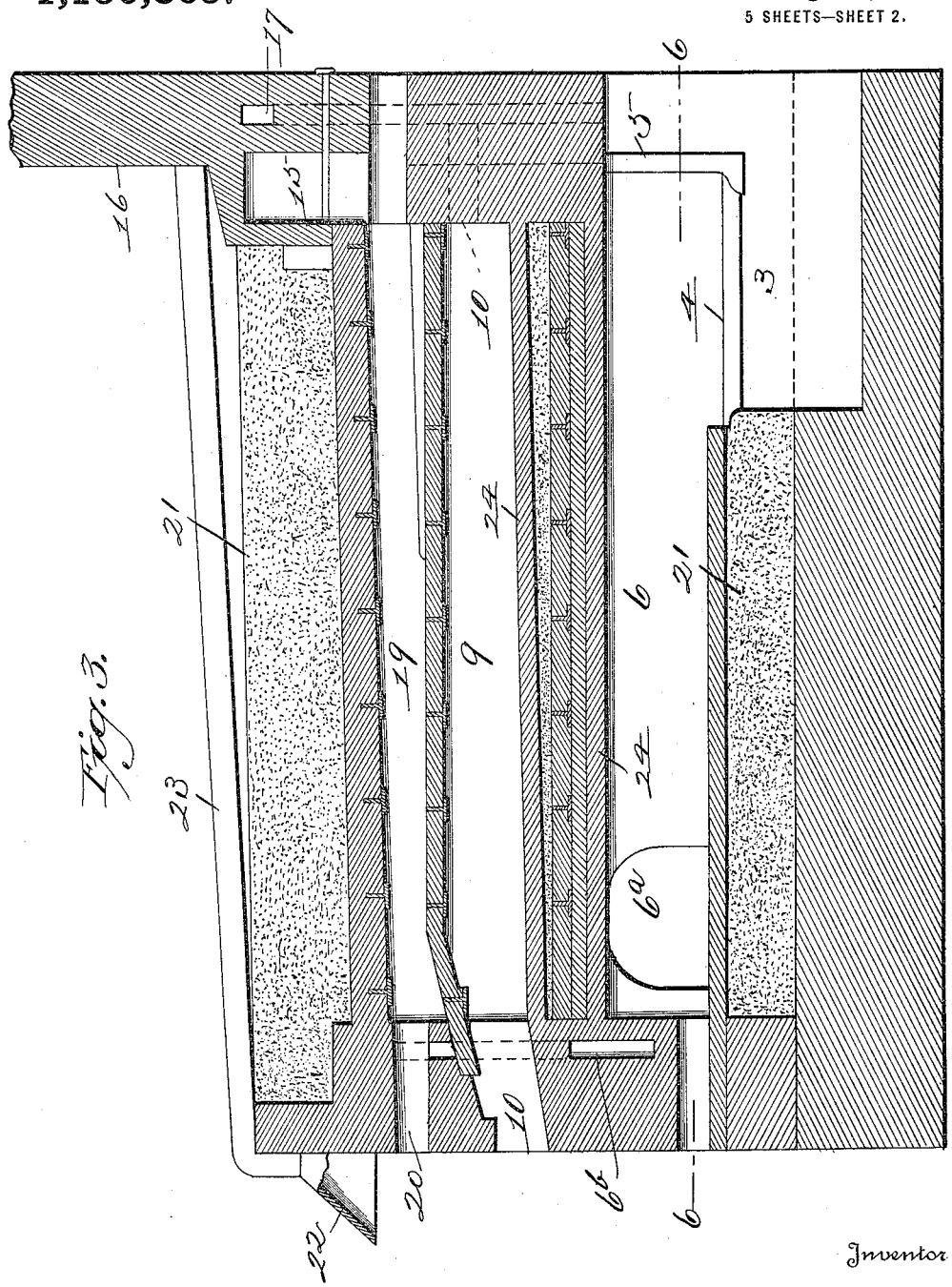

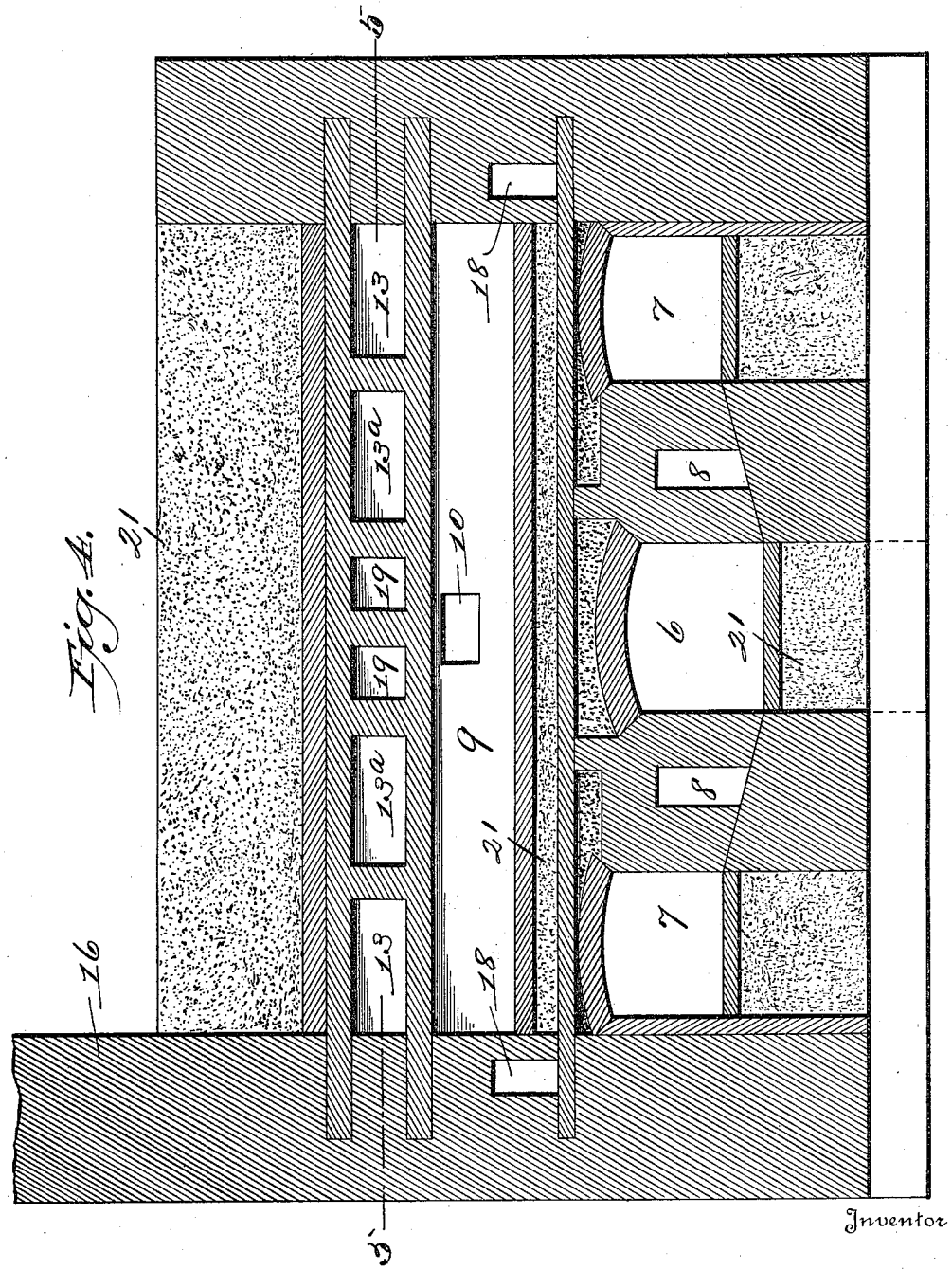

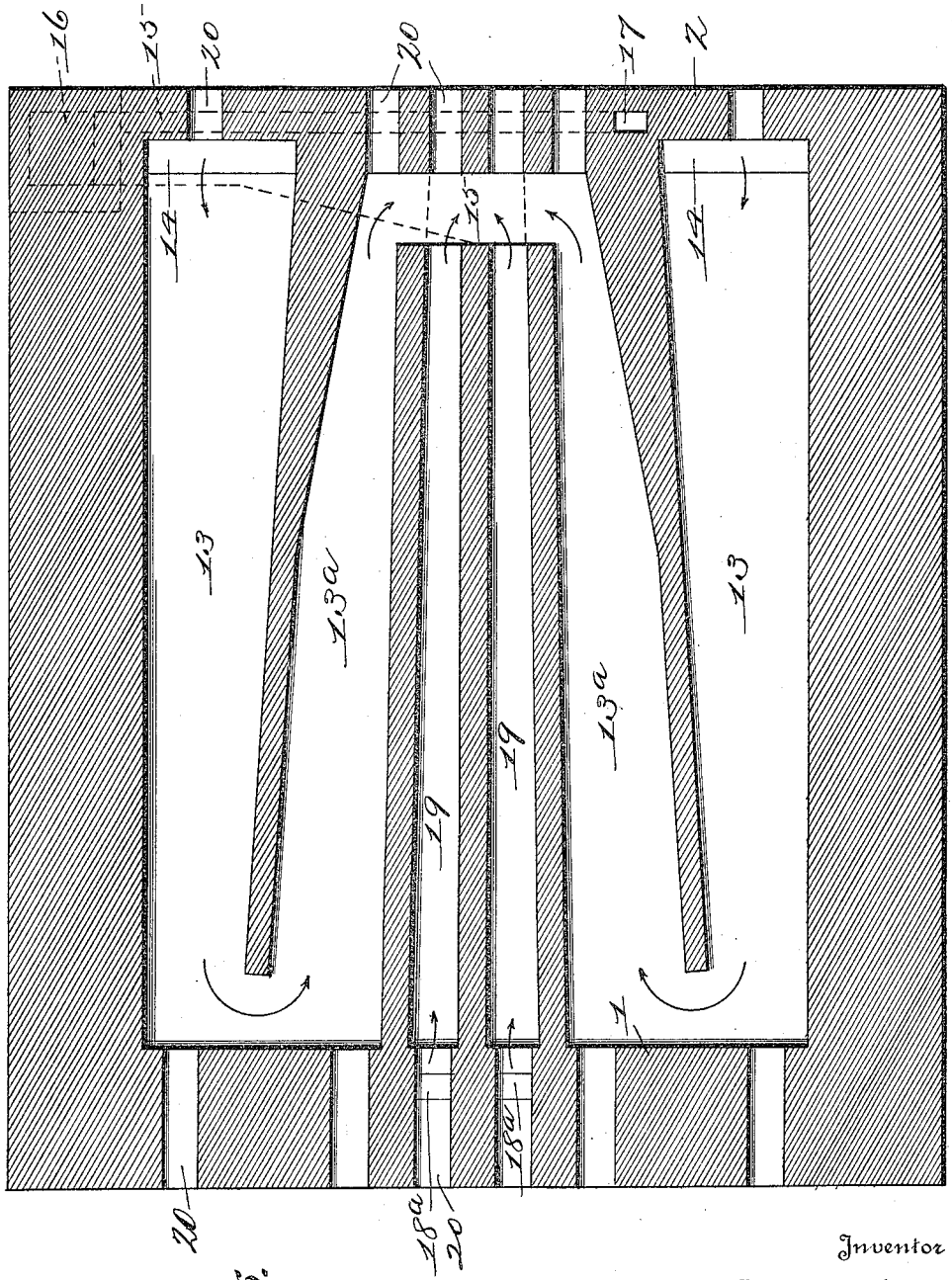

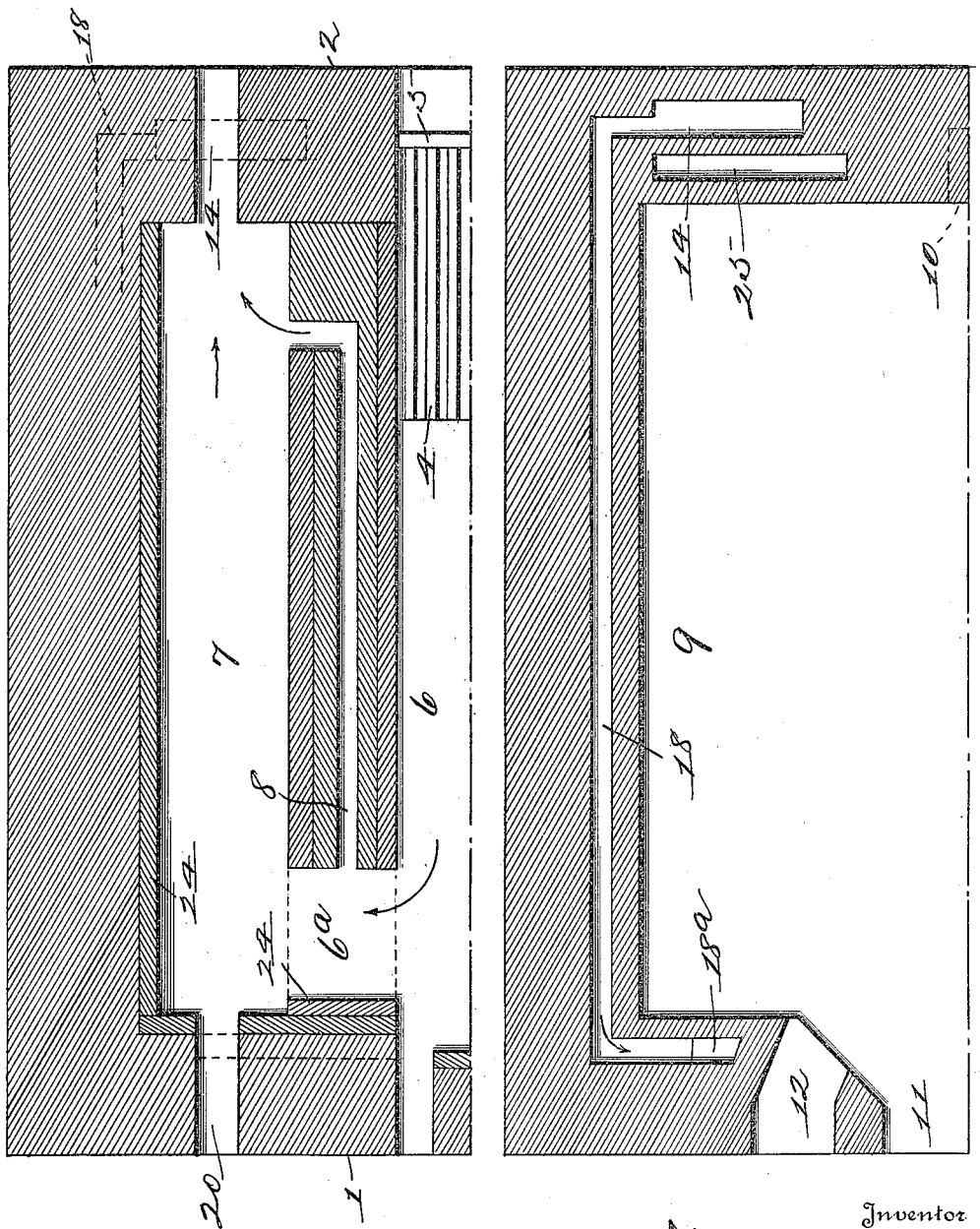

UNITED STATES PATENT OFFICE.

FREDRICH KOCH, OF PARSONS, KANSAS.

OVEN.

1,150,865.  Specification of Letters Patent.  Patented Aug. 24, 1915.

Application filed March 27, 1915. Serial No. 17,435.

*To all whom it may concern:*

Be it known that I, FREDRICH KOCH, a citizen of the United States, and a resident of Parsons, in the county of Labette and the State of Kansas, have invented a new and useful Improvement in Ovens, of which the following is a specification.

This is an improvement in a baker's oven and is intended to economize fuel, and at the same time, by reason of its rear feed, and other features of construction, to reduce to a minimum the amount of dust in the bake shop.

A further object of the invention is to provide for uniform distribution of heat, to permit regulation of the heat, and to permit easy access for cleaning to all flues.

An actual test of this construction in my own shop shows that this oven will bake from five to seven thousand loaves of bread in ten to twelve hours with the use of five bushels of the cheapest grade of coal, and in another test twenty-five hundred loaves per day have been baked per week on seventeen bushels of coal, besides baking the usual assortment of buns, pies and cakes usually turned out by a bakery. These results are obtained by the arrangement of the flues and the manner in which they are protected.

Figure 1:
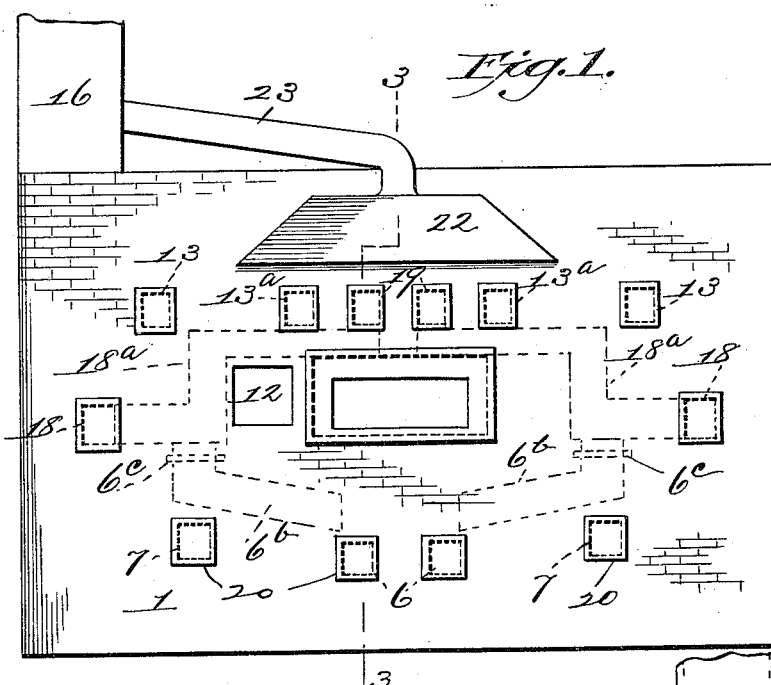
Figure 2:
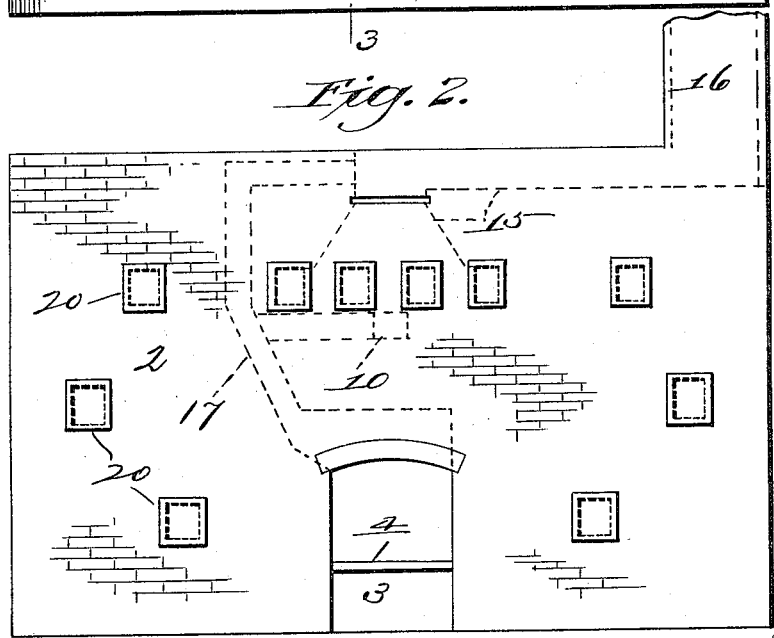

The invention consists of the novel features of construction hereinafter described, pointed out in the claims, and shown in the accompanying drawings, in which:

Figure 1 is a front elevation. Fig. 2 is a rear elevation. Fig. 3 is a section on the line 3—3 of Fig. 1. Fig. 4 is a transverse section, taken vertically and looking toward the rear. Fig. 5 is a section on the line 5—5 of Fig. 4. Fig. 6 is a section on the line 6—6 of Fig. 3. Fig. 7 is a horizontal section of one half of the oven taken along the line of the top flues.

In addition to the usual solid side walls the oven is provided with front and rear walls 1 and 2, the walls being preferably of brick on a concrete foundation.

Referring more especially to Fig. 3 it will be noted that a furnace is arranged at the rear in which is placed a grate 4, the compartment 3 under the grate forming an ash pit. A door frame 5 is arranged at the rear end of the grate 4. Any suitable form of door, not shown can be used. The fire box is that portion above the grate and is continued forwardly to the front wall in the form of a large central flue 6 which communicates through arched openings $6^a$ with side flues 7. The walls between the flues 6 and 7 are of considerable thickness and these walls contain small by-flues 8 which open at their forward ends into the arched openings or passageways $6^a$ and have their rear ends angled to open into the flues 7. The greater portion of the heat and products of combustion pass from the furnace portion forwardly along the central flue 6 then through the passageways into the flues 7, portions of the products of combustions traveling through the by-flues 8, but all finally reaching the flues to be hereafter described.

Extending horizontally and above the flues 6 and 7 is the baking compartment or oven proper, 9, having a rear opening 10 for the escape of steam, and a front opening 11 which is normally closed by a door of any kind. Adjacent and to one side of said door opening 11 is a sight opening 12, which may be closed by any form of transparency.

Referring now to Fig. 5 which shows the arrangement of the flues above the baking chamber 9 it will be noted that on each side are large flues 13, communicating at their rear with the flues 7 through vertical flues 14. The heat therefore after passing to the front and then back to the rear under the chamber 9 through flues 6 and 7, is carried up at the back through flues 14 and enters the flues 13 and again passes to the front and above the oven chamber 9. At the front the flues 13 communicate with centrally arranged and rearwardly extending flues $13^a$, which narrow as they pass to the rear and discharge into a common outlet 15 which leads to a chimney 16, as indicated by dotted lines in Fig. 2. These may be considered the main flues, but to more evenly distribute the heat and to permit its ready regulation, especially at the front, I employ a number of small supplemental flues.

By referring to Fig. 4 it will be noted that there are two flues 18, one on each side of the chamber 9. In Fig. 7 the full course of one of these flues is shown and it will be noted that at the rear it communicates with one of the flues 14. At the front it communicates with a flue $18^a$. There are two flues $18^a$ in the front wall 1 and they angle upwardly as shown in Fig. 1 and communicate with the forward ends of flues 19. The flues 19 run from front to rear above the chamber 9 and between the flues $13^a$ and also discharge into the common outlet 15. To throw an additional amount of heat to the front when desired I also run two flues 6ᵇ in the front wall which lead, respectively, from opposite sides of the flue 6 and lead into the flues 18ᵃ, as indicated in dotted lines in Fig. 1. Dampers 6ᶜ are arranged in the flues 6ᵇ so that they may be closed when not needed. From the upper portion of the fire box there runs a smoke flue 17 of comparatively small size direct to the outlet flue 15, and this is tapped by the flue 10 leading from the chamber 9 and through which steam escapes. Suitable cleanout openings 20 are provided for all of the flues at both front and rear, and it is of course understood that suitable closures will be provided for said openings, but I have not considered it necessary to show all doors, closures, etc., connected with the oven as these do not properly form a part of the invention which resides mainly in the arrangement of the flues. Under the lower flues 6 and 7 and above the upper flues 13, and 19 sand is packed as shown at 21. A dust collecting hood is hung over the front of the oven, at 22, and a dust pipe 23 leads from said hood to the chimney 16. The flues are lined with fire brick 24, and ordinary brick can be used in other places. Dead air spaces 25 are arranged at the rear of the chamber 9 and between the same and the rear flues 14.

The advantages of this construction will be obvious to those experienced in the use of ovens of this kind.

What I claim is:

1. In an oven, a baking chamber having a front opening, a fire box at the rear and beneath said chamber, a central flue forming a forward continuation of said fire-box, parallel side flues extending from front to rear and communicating with the first mentioned flue at their forward ends, rear vertical flues leading from the second mentioned flues, side flues arranged in a plane above said baking chamber and leading forwardly from the rear vertical flues, centrally arranged contracted flues leading rearwardly above the baking chamber and communicating at their forward ends with the said side flues last mentioned, a common discharge flue for the centrally arranged contracted flues, and supplemental flues arranged respectively at the sides and above the baking chamber and discharging into the said common discharge, said supplemental flues also communicating with the rear vertical flues and with the forward end of the first mentioned flue.

2. In an oven fired from the rear, a baking chamber opening at the front, a fire box at the rear and below said chamber, a central forwardly extending flue leading from said fire box, side rearwardly extending flues spaced from and communicating at the front with the central flue, by-flues arranged between said side flues and the central flue and communicating at their forward ends with the central flue and at their rear ends with the side flues, oppositely arranged coöperating flues arranged in a plane above the chamber, rear vertical flues connecting the side flues with the rear portions of two of said coöperating flues, a stack in communication with the remaining two upper coöperating flues, supplemental flues at the sides of the baking chamber and communicating at the rear with the vertical flues, supplemental flues arranged between the inner flues of the coöperating flues above the chamber and in communication with said stack, flues in the front wall of the oven leading from the first supplemental flues to the second supplemental flues, and damper controlled flues in the front wall leading from the first mentioned central flue to front wall flues above mentioned.

FREDRICH KOCH.

Witnesses:
A. M. Eckelberry,
O. C. Snodgrass.